Dec. 13, 1955 S. S. BROWN 2,727,215
SELECTOR SWITCH
Filed April 30, 1952 2 Sheets-Sheet 1

INVENTOR
STEFFEN S. BROWN
BY Toulmin & Toulmin
ATTORNEYS

Dec. 13, 1955 S. S. BROWN 2,727,215
SELECTOR SWITCH
Filed April 30, 1952 2 Sheets-Sheet 2
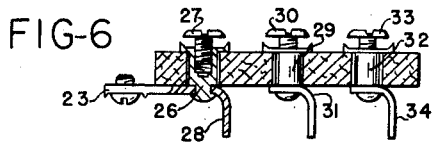
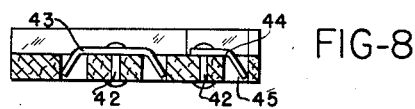
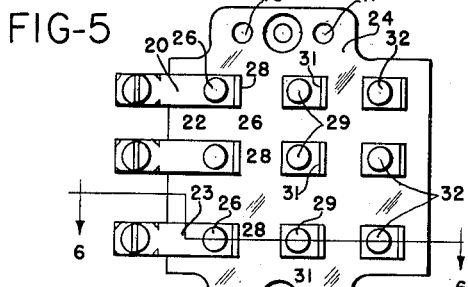
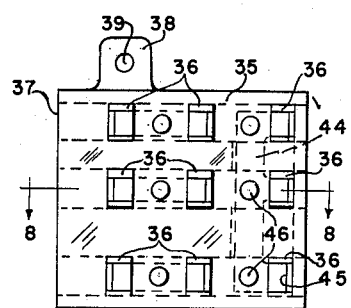
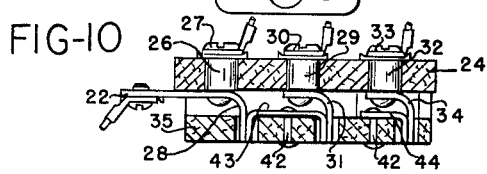
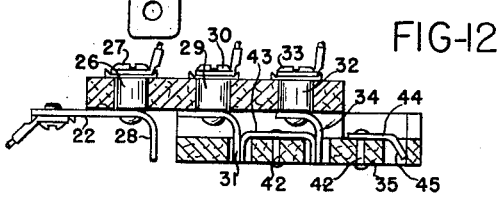
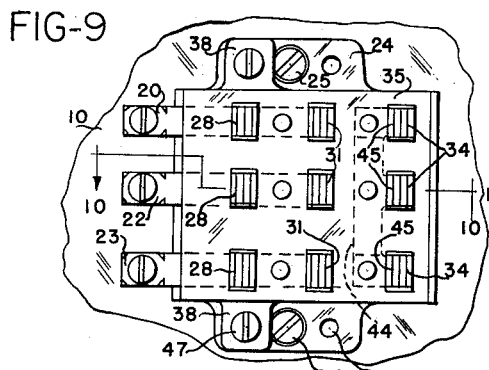
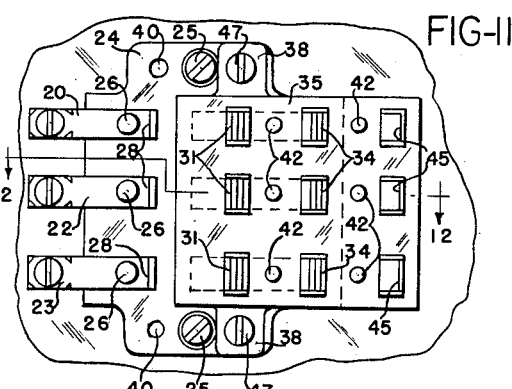
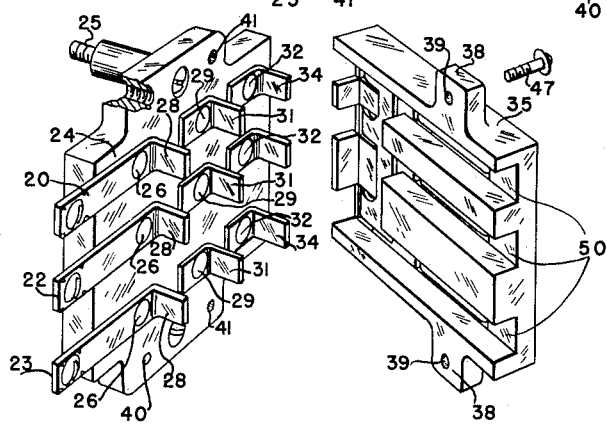
INVENTOR
STEFFEN S. BROWN
BY Toulmin & Toulmin
ATTORNEYS

United States Patent Office 2,727,215
Patented Dec. 13, 1955

2,727,215
SELECTOR SWITCH

Steffen S. Brown, Dayton, Ohio, assignor to The Brown-Brockmeyer Company, Dayton, Ohio, a corporation of Ohio Application April 30, 1952, Serial No. 285,095

6 Claims. (Cl. 339—32)

This invention relates to switches, particularly to switches for electric motors and most particularly to switches for electric motors for selecting between one or another set of operating conditions for the motor.

Most three-phase motors, at least in the smaller sizes thereof, are constructed with the field coils wound in halves so that when the coils are connected in parallel in any one branch a lower operating voltage obtains and when the coils are connected in series in the branch a higher operating voltage obtains. This enables the motors to be readily adapted to the ordinary lower domestic voltage of 115 volts or to a higher industrial voltage of 230 volts. The motors are likewise provided for 220–440 volt operation and any other combinations that may be desired.

With a three-phase motor of the type referred to there are nine leads coming from the motor and six of the connections must be interchanged to change from lower voltage operation to higher voltage operation. This is usually accomplished manually, although some switch arrangements have been constructed which will effect these changes, such as ones of the type illustrated in my co-pending applications, Serial Numbers 188,454, filed October 4, 1950, now Patent No. 2,619,621; 267,480, filed January 21, 1952, now Patent No. 2,664,473 and 270,453 filed February 7, 1952, and all assigned to the same assignee as this application.

The switches disclosed in the co-pending applications referred to above are all of the rotary type and have certain advantages because of this, but have the disadvantage in that they are somewhat expensive to manufacture and are somewhat bulky. The need, therefore, exists for an inexpensive tap changing switch or selector switch which is inexpensive to construct and which is small so that it can be mounted within a conduit box.

Having the foregoing in mind, the particular object of the present invention is the provision of a tap changing or selector switch particularly adapted for use with electric motor and which is small enough to be readily received within the usual conduit box associated with an electric motor.

Another object is the provision of a switch of the nature described which is quite inexpensive to manufacture.

Still another object of this invention is the provision of a switch of the nature described which it is impossible to adjust improperly.

These and other objects and advantages will become more apparent upon reference to the following specification taken in connection with the accompanying drawings, in which:

Figure 5 is a view looking in at the stationary element of the switch.

Figure 6 is a sectional view indicated by line 6—6 of Figure 5.

Figure 7 is a view looking in at the adjustable portion of the switch.

Figure 8 is a sectional view indicated by line 8—8 on Figure 7.

Figure 9 is a view looking in at the switch as it is adjusted for lower voltage operation of the motor.

Figure 10 is a sectional view indicated by line 10—10 on Figure 9.

Figure 11 is a view like Figure 9 but showing the switch adjusted for higher voltage operation of the motor.

Figure 12 is a sectional view indicated by line 12—12 on Figure 11.

Figure 13 is an exploded perspective view of the two parts making up the switch according to my invention.

Figure 1:
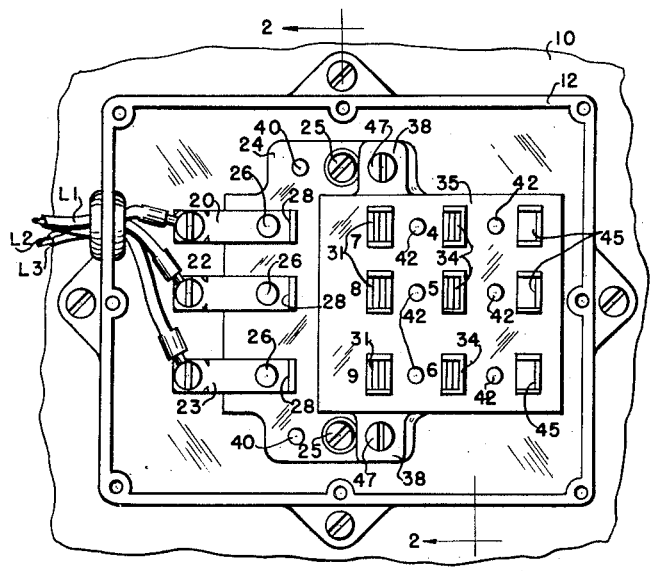
Figure 1 is a view looking in at an open conduit box showing the switch according to my invention arranged therein.
Figure 2:
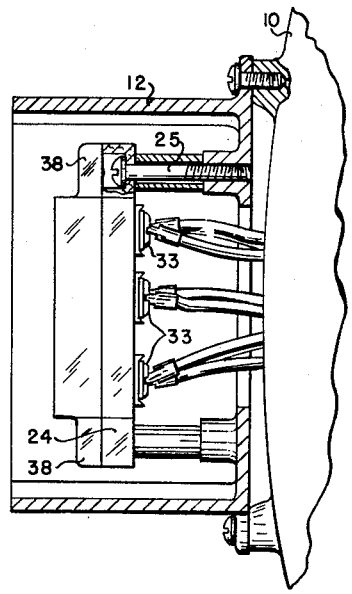
Figure 2 is a section indicated by line 2—2 of Figure 1.

Referring to the drawings somewhat more in detail, the frame of the motor in Figures 1 and 2 is indicated at 10 and mounted thereon is a conduit box 12 of any suitable and well-known construction and into which the leads from the motor are led as well as the power lines L–1, L–2 and L–3 which supply power for operating the motor.

Figure 3:
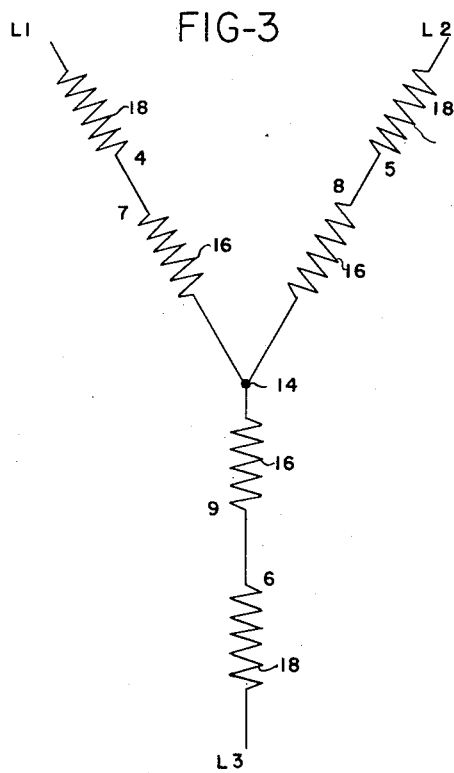
Figure 3 is a diagrammatic representation of the field of a three-phase motor connected for higher voltage operation.
Figure 4:
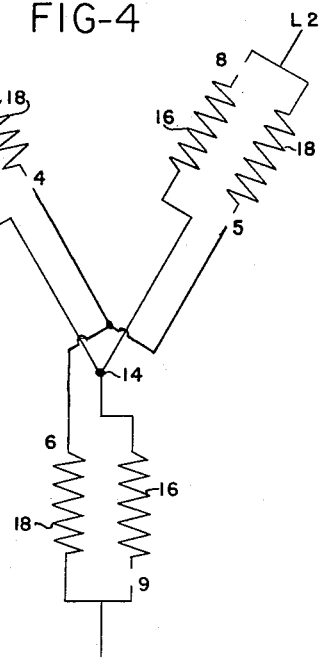
Figure 4 is a view similar to Figure 3 but showing the motor connected for lower voltage operation.

The windings of the motor are illustrated in Figures 3 and 4 and are connected in star connection with a common terminal at 14 and the power lines L–1, L–2 and L–3 connected to the outer ends of the three branches. Each branch of the winding consists of a first portion marked 16 and a second portion marked 18, with one end of each of the portions 16 connected with the common terminal 14 and the other ends of the said portions 16 being led out to the switch referred to above.

The portions 18 of the windings have both of their ends led out to the switch of this invention with the outer ends of the said portions as there are represented in Figures 3 and 4 being connected with the power lines L–1, L–2 and L–3.

Referring now to Figures 6 through 13, the power lines L–1, L–2 and L–3 are connected to the members 20, 22 and 23, respectively, of the stationary portion of the switch which comprises an insulating panel 24 adapted for being fixedly mounted in the conduit box by means of the screws 25 as illustrated in Figure 2.

The members 20, 22 and 23 are each secured in position on panel 24 by means of a corresponding stud 26 which receives a clamping screw 27 on the back side of panel 24 for connection thereto of one of the motor leads.

The ends of the members 20, 22 and 23 adjacent the points at which they are secured by the said studs are turned upwardly, as indicated at 28 in Figure 10.

Reference to Figure 5 will reveal that the members 22 and 23 are spaced farther apart than the members 20 and 22 and this is done for the purpose of preventing the adjustable portion of the switch, to be described hereinafter, from being placed in an improper position on the panel 24.

Panel 24 comprises a second row of studs 29 arranged in alignment with the studs 26, and each of studs 29 also comprising a clamping screw 30 in the back for connection to the stud of one of the motor leads while on the front side of panel 24 each of studs 29 has a member 31 connected thereto turned upwardly like portion 28 of the members 20, 22 and 23.

Still a third row of studs 32 is provided in panel 24 which likewise are provided with clamping screws 33 for clamping motor leads to the associated studs, and each stud also has the turned-up member 34 connected thereto on the front side of panel 24.

The described arrangement of panel 24 and the mounting studs therein is such that the power lines L-1, L-2 and L-3 can be connected with the members 20, 22 and 23 with the nine motor leads previously referred to being clamped under the screws 27, 30 and 33. The motor leads are connected with the said studs so that the outer ends of the portions 18 of the windings as they are viewed in Figures 3 and 4 are clamped by the screws 27.

The outer ends of the inner portions 16 of the windings are clamped by the screws 30 of the metal row of studs and the inner ends of the outer portions 18 of the windings are clamped by the screws 33 on the last row of studs.

The switch according to this invention comprises an adjustable member 35 having a plurality of apertures 36 distributed thereover into which the upturned portions 28, 31 and 34 which are secured to the studs 26, 29 and 32 will extend.

The member 35 comprises an insulating panel 37 having mounting ears or lugs 38 thereon with holes 39 that are adapted for registering with the threaded holes 40 and 41 on panel 24.

When member 35 is positioned so that holes 39 register with holes 40, the said member occupies the position on panel 24 in which it is illustrated in Figure 9 and when holes 39 register with holes 41, member 35 occupies the position on panel 24 in which it is illustrated in Figures 1 and 11.

Secured to the back of member 35, as by the rivets 42, are the U-shaped contacting strips 43 having their ends turned up so as to extend into the apertures 36.

Also fastened to the back side of member 35 is still another strip 44 extending vertically along the member, as it is viewed in Figure 7, and having portions extending therefrom and bent up into the righthand row of apertures 36. These bent-up portions are indicated at 45. Rivets 46 may be provided for retaining strip 44 in position.

The turned-up ends of the strips 43 and the turned-up portions 45 of strip 44 are resilient and when member 35 is disassembled from panel 24 the said turned-up portions occupy the position in which they are illustrated in Figure 8. When the member 35 is mounted on panel 24, however, the said bent-up portions will yield and effect good electrical contact with the upstanding members 28, 31 and 34.

When the member 35 is mounted in position on panel 24, the screws 47 are availed of for clamping the member in position.

Reference to Figures 9 and 10 will indicate that when member 35 is mounted on panel 24 in its lefthand position, as the parts are viewed in the drawings, the strip 44 on member 35 serves to interconnect the inner ends of the outer portions 18 of the motor winding while the strips 43 serve to interconnect power lines L-1, L-2, and L-3 with the outer ends of the inner portions 16 of the windings whereby lower voltage operation of the motor obtains.

However, when the member 35 is adjusted to its righthand position, as it is viewed in the drawings and in which position it is illustrated in Figures 11 and 12, only the strips 43 are effective and they serve to interconnect the inner ends of outer portions 18 of the windings with the outer ends of the inner portions 16 whereby higher voltage operation of the motor obtains.

In Figure 13 it will be observed that the member 35 is advantageously a molded phenolic or the like comprising grooves 50 which intersect the apertures 36 and in which the strips 43 and 44 can be mounted. The ribs between the channels and at the side edges of member 35 provide means for abutting the outer face of panel 24 whereby when the two parts of the switch are assembled they form a solid integral unit.

It will be evident that the switch constructed according to this invention is quite small and compact so that it can readily be mounted within a conduit box where it will not be harmed and cannot be adjusted or moved by accident and, further, that the switch is capable of being produced quite economically by substantially standard manufacturing processes.

The arrangement of the switch is such that it is impossible to assemble the two portions thereof incorrectly and, therefore, there is no chance of the motor being burned out or damaged due to improper connections of the windings in the switch.

In referring to the windings of the motor it will be understood that there will be arranged in the motor frame in the usual manner with the two portions of each leg being as nearly identical in electrical and magnetic characteristics and position as possible. For convenience the parts of the windings are referred to, however, as "inner" and "outer" with reference to the position they occupy in Figure 3.

It will be understood that this invention is capable of modification to adapt it to different usages and size and it is, therefore, intended to comprehend within this invention such modifications and substitutions of equivalents and other changes as may be considered to come within the scope of the appended claims.

I claim:

1. In a switch of the nature described: a first panel of insulating material, a plurality of separate contact elements distributed over the panel in rows and columns and each contact element having a flat blade portion upstanding from the front face of the panel, a second panel of insulating material adapted for being mounted on the front face of the first panel in face to face engagement therewith said second panel being provided with apertures in rows and columns to receive the said blade portions of the contact elements, conductors on the second panel extending between and having portions bent up into said apertures for effecting connections between said contact elements when the panels are assembled, certain of said conductors having both ends bent into said apertures and each of the remaining conductors having one end portion bent into an adjacent aperture, said second panel being adjustable on said first panel in the direction of the said rows to provide for different connections between said contact elements, and means for securing said panels together in their several adjusted positions with said blade portions of said contact elements and the said portions of said conductors in pressure engagement.

2. In a switch of the nature described; a first panel of insulating material, a plurality of separate contact elements distributed over the panel in rows and columns and each contact element having a flat blade portion upstanding from the front face of the panel, a second panel of insulating material adapted for being mounted on the front face of the first panel in face to face engagement therewith, said second panel being provided with apertures in rows and columns to receive the said blade portions of the contact elements, and conducting strips on said second panel on the side thereof toward the first panel having flat resilient portions thereon extending into said apertures and diagonally thereacross for making connections between said contact elements when the panels are assembled, some of said strips extending between the apertures in the same row and at least another of said strips extending between the apertures in the same column.

3. In a switch of the nature described: a first panel of insulating material adapted for being mounted within a conduit box, a plurality of studs in said panel in rows and columns, means for connecting wires to the studs in back of the panel, contact elements on the studs in front of the panel having flat blade portions upstanding from the face of the panel, a second panel of insulating material adapted for being detachably mounted in face to face engagement with the front of said first panel and having apertures therein in rows and columns for receiving the said blade portions of the contact elements, and a plurality of conducting strips on said second panel having flat resilient portions thereon extending into said apertures and diagonally thereacross for effecting connections between said contact elements when the panels are assembled.

4. In a switch of the nature described: a first panel of insulating material adapted for being mounted within a conduit box, a plurality of studs in said panel in rows and columns, means for connecting wires to the studs in back of the panel, contact elements on the studs in front of the panel having flat blade portions upstanding from the face of the panel, a second panel of insulating material adapted for being detachably mounted in face to face engagement with the front of said first panel and having apertures therein in rows and columns for receiving the said blade portions of the contact elements, and a plurality of conducting strips on said second panel having flat resilient portions extending therefrom into said apertures and diagonally thereacross for effecting connections between said contact elements when the panels are assembled, the said rows having different spacings therebetween whereby the panels can be assembled with the rows of contact elements and apertures in only one relation to each other.

5. In a switch of the nature described: a first panel of insulating material adapted for being mounted within a conduit box, a plurality of studs in said panel in rows and columns, means for connecting wires to the studs in back of the panel, contact elements on the studs in front of the panel having flat blade portions upstanding from the face of the panel, a second panel of insulating material adapted for being detachably mounted in face to face engagement with the front of said first panel and having apertures therein in rows and columns for receiving the said blade portions of the contact elements, and a plurality of conducting strips on said second panel on the side thereof toward said first panel having flat resilient portions extending therefrom into said apertures and diagonally thereacross for effecting connections between said contact elements when the panels are assembled, said first panel having threaded holes along opposite edges in lines parallel to said rows of contact elements, and said second panel having an aperture in each of two opposite edges to register with said holes to receive clamp screws threaded into the holes to clamp the panels together.

6. In a switch of the nature described: a first panel of insulating material adapted for being mounted within a conduit box, a plurality of studs in said panel in rows and columns, means for connecting wires to the studs in back of the panel, contact elements on the studs in front of the panel having flat blade portions upstanding from the face of the panel, a second panel of insulating material adapted for being detachably mounted in face to face engagement with the front of said first panel and having apertures therein in rows and columns for receiving the said blade portions of the contact elements, and a plurality of conducting strips on said second panel on the side thereof toward said first panel having flat resilient portions extending therefrom into said apertures and diagonally thereacross for effecting connections between said contact elements when the panels are assembled, certain of said contact elements at one side of said first panel projecting laterally therefrom and comprising means for connection to electric power supply lines.

References Cited in the file of this patent

UNITED STATES PATENTS

| | | |
|---|---|---|
| 1,549,242 | Wilson | Aug. 11, 1925 |
| 1,652,708 | Deleeuw | Dec. 13, 1927 |
| 1,754,645 | Oswald | Apr. 15, 1930 |
| 1,869,936 | Griswold | Aug. 2, 1932 |
| 1,992,925 | Lodge | Feb. 26, 1935 |
| 2,006,436 | Bowers | July 2, 1935 |
| 2,111,118 | Lake | Mar. 15, 1938 |
| 2,125,256 | Fairbanks | July 2, 1938 |
| 2,321,999 | Dalton | June 15, 1943 |
| 2,507,242 | Bost | May 9, 1950 |
| 2,552,028 | Blair | May 8, 1951 |
| 2,594,069 | Poehlmann | Apr. 22, 1952 |
| 2,613,287 | Geiger | Oct. 7, 1952 |